A. E. OSBORN.
MOTOR VEHICLE.
APPLICATION FILED JULY 26, 1920.

1,428,053.

Patented Sept. 5, 1922.

Inventor
Alden E. Osborn

Patented Sept. 5, 1922.

1,428,053

UNITED STATES PATENT OFFICE.

ALDEN E. OSBORN, OF NEW YORK, N. Y.

MOTOR VEHICLE.

Application filed July 26, 1920. Serial No. 399,107.

*To all whom it may concern:*

Be it known that I, ALDEN E. OSBORN, a citizen of the United States, and a resident of the city of New York, county of the Bronx, and State of New York, have invented a new and Improved Motor Vehicle, of which the following is a specification.

This invention relates particularly to a method of driving the steering wheel or wheels of motor vehicles whereby said wheel or wheels can have driving connection with the motor of the vehicle while it or they are turned through various angles to steer the same. The invention is especially suited to be used in connection with a single front steering wheel of a three wheeled vehicle and when so used enables an exceedingly simple and cheap type of motor vehicle to be produced that has some very great advantages among which are low operating costs, great efficiency in the application of power and freedom from skidding.

In the accompanying drawing:—

Figure 1:
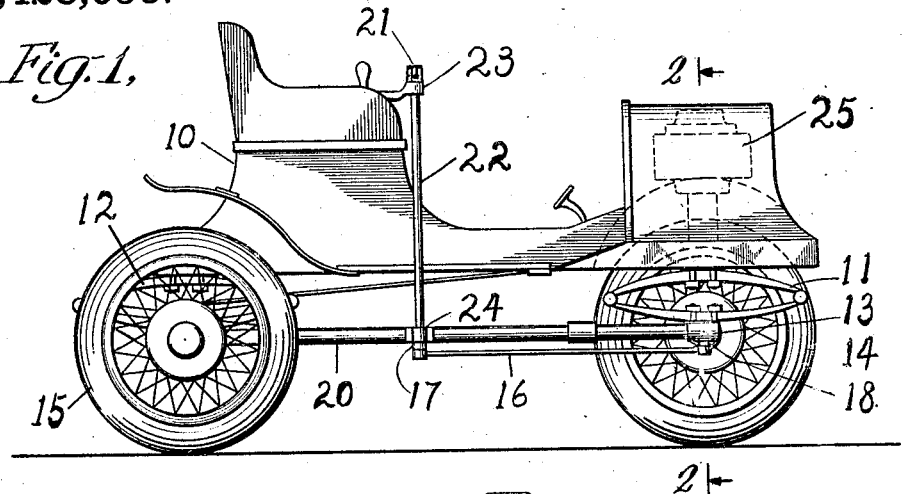
Figure 2:
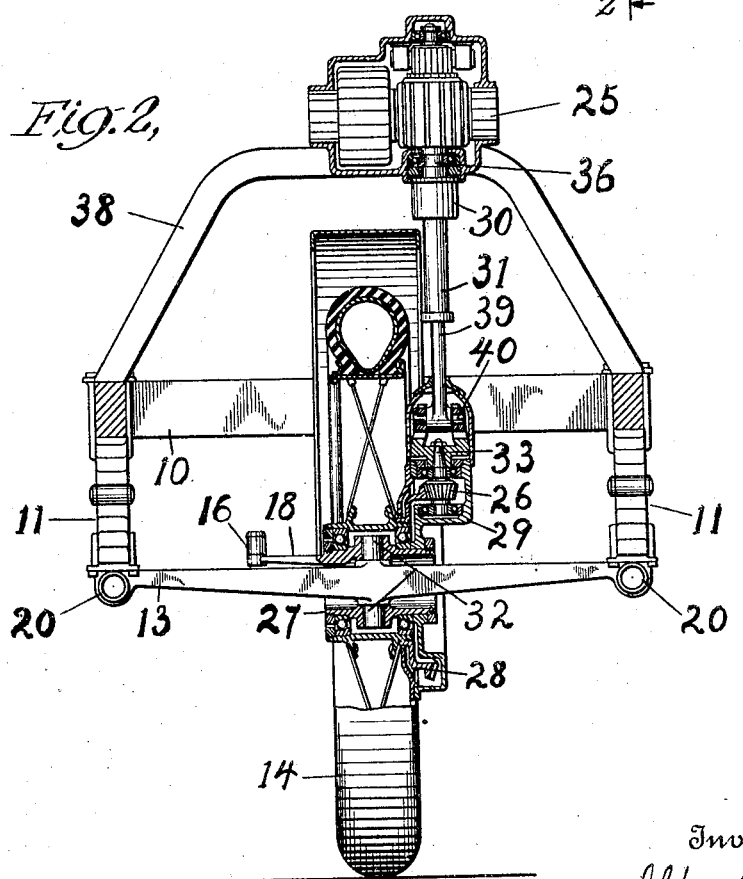

Figure 1 represents a side elevation of a motor vehicle embodying the various features of my invention; and Figure 2 represents a partial sectional front elevation of Figure 1 taken on the line of the front axle.

Similar numerals refer to similar parts in both views.

In the vehicle illustrated in Fig. 1 the body 10 is shown as of the passenger carrying type although a vehicle of this character is obviously especially suited for use with a body intended for light delivery work. The body is shown as mounted on springs 11 at the front and springs 12 at the rear which in turn are carried by the front axle 13 and the rear axle which, however, is not shown and may consist, in a vehicle of this design, of simply a straight tube or rod having a rear supporting wheel 15 at each end. The two axles are shown as connected by a suitable under framing 20 but it is, however, perfectly practical to omit such framing and use the body framing for the same purpose or to modify it as desired. The front wheel 14 is arranged so that it can be oscillated on the front axle 13 in order to steer the vehicle and a rod 16 is connected to the lever 18 on the wheel support and to the lever 17 on the steering shaft 22 so that the motion of the shaft (which is provided with a suitable steering handle 21 at its upper end) is transmitted to the wheel to oscillate the same for steering. A peculiar feature of this steering gear is that the steering shaft 22 has a bearing 24 carried by the under-framing while the other bearing 23 is carried by the vehicle body 10 and in order to allow for the relative movement of the frame and body these bearings, including that between the lever 17 and rod 16, may be made with ball and socket or spherical surfaces while the vertical motion of the body can be allowed for by having the shaft 22 telescope or slide, as well as turn, in one or the other of these bearings 23 or 24 the shaft 22 being made slightly longer than shown at the bearing in which it slides in order to give the parts clearance to allow for the movement. It is not, of course, absolutely necessary to use this type of steering gear with the other parts of my invention shown in the drawing although it possesses certain advantages for a light vehicle of the kind shown. The other parts of the vehicle may be of any design desired and the propelling motor 25, which is shown as of the electric type, may be of any other kind and may be arranged with its main shaft vertical, as shown, or with its main shaft in any other position and geared to a suitable vertical shaft.

I will now describe the steering wheel driving mechanism particularly and for this purpose reference should be made to Fig. 2. In this Fig. 27 indicates the pivoted support for the wheel 14 which support oscillates on the axle 13 about the pins 32 when steering the vehicle. The wheel support 27 is shown as carrying the lever 18 above the axle 13 in this Fig. while in Fig. 1 this lever is below the axle, this difference in construction being illustrated in order to show that the steering connection can be made to the support 27 at any desired point or either side of the wheel. The support 27 also carries the gear casing 29 which contains the bevel gear 28, attached to the wheel 14, and the bevel pinion 26, attached to the shaft 33, which shaft is in turn mounted in suitable bearings in the casing. This shaft also carries the universal joint 40 which is connected to the second universal joint 30 attached to the vertical motor shaft 36 by an intermediate shaft 39 containing a slip joint 31 in order to allow for the vertical movement of the body. The exact construction of these universal joints and the slip joint is not important to my invention as many different forms may be used and even one of the universal joints may be used as the slip joint as there are several types of joint suitable for such combined uses. The motor 25 is shown as mounted on a frame member 38 which passes over the wheel 14 and is attached to the framing of the body 10 at each side thereof. The member 38 may, however, be carried by the axle 13 or underframing 20 although in this case the motor would not have the advantage of being supported by the body springs. It is obvious that suitable gearing, clutches or other power transmitting or speed controlling devices may be fitted between the motor shaft and universal joint 30, or at any other point in the transmission system, in order that the speed of the vehicle can be controlled independently of the motor speed. Such arrangements would be desirable when the usual type of internal combustion motor is used.

Having thus described my invention, I claim as new and desire to secure by Letters Patent—

1. In a motor vehicle the combination of a traction wheel, a support for said wheel about which said wheel can rotate, an axle on which said support is pivotally mounted, a spring mounted on said axle, a substantially vertical power transmitting shaft supported by said spring, and means for transmitting motion between said power transmitting shaft and said wheel independently of the angle which said wheel may assume through the turning of said support on said pivotal mounting.

2. In a motor vehicle the combination of a traction wheel, a support for said wheel about which said wheel can rotate, an axle on which said support is pivotally mounted, springs on said axle at both sides of said wheel, a substantially vertical power transmitting shaft between said springs and adjacent to said wheel and supported by said springs, and means for transmitting motion between said power transmitting shaft and said wheel independently of the angle which said wheel may assume through the turning of said support on said pivotal mounting.

3. In a motor vehicle the combination of a traction wheel, a support for said wheel about which said wheel can rotate, an axle on which said support is pivotally mounted and extending from both sides of said support, a substantially vertical power transmitting shaft adjacent to said wheel and supported by said axle, and means for transmitting motion between said power transmitting shaft and said wheel independently of the angle which said wheel may assume through the turning of said support on said pivotal mounting.

4. In a motor vehicle the combination of a traction wheel, a support for said wheel about which said wheel can rotate, an axle on which said support is pivotally mounted, a substantially vertical power transmitting shaft adjacent to said wheel, a propelling motor connected with said shaft, means for supporting said motor substantially over said traction wheel, and means for transmitting motion between said power transmitting shaft and said wheel independently of the angle which said wheel may assume through the turning of said support on said pivotal mounting.

5. In a motor vehicle the combination of two trailing wheels, an axle for said wheels, a traction wheel, a support for said wheel about which said wheel can rotate, an axle on which said support is pivotally mounted and extending from both sides of said support, a frame attached to said axle on both sides of said support and connecting said axle with the first named axle, a propelling motor supported substantially over said traction wheel, and means for transmitting motion between said motor and said wheel independently of the angle which said wheel may assume through the turning of said support on said pivotal mounting.

6. In a motor vehicle the combination of two trailing wheels, an axle for said wheels, a traction wheel, a support for said wheel about which said wheel can rotate, an axle on which said support is pivotally mounted and extending from both sides of said support, springs on said axle at both sides of said wheel, a body framing attached to said springs and connecting with the first named axle, a propelling motor supported by the body framing substantially over said traction wheel, and means for transmitting motion between said motor and said wheel independently of the angle which said wheel may assume through the turning of said support on said pivotal mounting.

7. In a motor vehicle the combination of a traction wheel, a support for said wheel about which said wheel can rotate, an axle on which said support is pivotally mounted, and extending from both sides of said support, a power transmitting shaft rotatably mounted on said support, and means for transmitting motion between said power transmitting shaft and said traction wheel.

8. In a motor vehicle the combination of a traction wheel, a support for said wheel about which said wheel can rotate, an axle on which said support is pivotally mounted and extending from both sides of said support, a power transmitting shaft rotatably mounted on said support and geared to the wheel, and means for rotating said shaft.

9. In a motor vehicle the combination of a traction wheel, a support for said wheel about which said wheel can rotate, an axle on which said support is pivotally mounted and extending from both sides of said support, a power transmitting shaft rotatably mounted on said support, means for transmitting motion between said power transmitting shaft and said traction wheel, a second power transmitting shaft supported by members connected with said axle and means for transmitting motion between said second power transmitting shaft and said first named power transmitting shaft independently of the angle through which said support may be turned when sluing the wheel for steering the vehicle.

10. In a motor vehicle the combination of a traction wheel, a support for said wheel about which said wheel can rotate, an axle on which said support is pivotally mounted, a power transmitting shaft rotatably mounted on said support, means for transmitting motion between said power transmitting shaft and said traction wheel, a propelling motor, a second power transmitting shaft connected with said motor, a spring supported framing carrying said motor and said second power transmitting shaft, and means for transmitting motion between said second power transmitting shaft and said first named power transmitting shaft independently of the angle through which said support may be turned when sluing the wheel for steering and of the action of said supporting springs.

11. In a motor vehicle the combination of a traction wheel, a support for said wheel about which said wheel can rotate, an axle on which said support is pivotally mounted, a power transmitting shaft rotatably mounted on said support, means for transmitting motion between said power transmitting shaft and said traction wheel, a propelling motor, a second power transmitting shaft connected with said motor, and means for transmitting motion between said second power transmitting shaft and said first named power transmitting shaft independently of the angle through which said support may be turned when sluing the wheel for steering the vehicle said means comprising a universal joint on the first named power transmitting shaft, a universal joint on the second named power transmitting shaft and an intermediate shaft connecting these two universal joints.

12. In a motor vehicle the combination of a traction wheel, a support for said wheel about which said wheel can rotate, an axle on which said support is pivotally mounted, a substantially vertical power transmitting shaft rotatably mounted on said support, means for transmitting motion between said power transmitting shaft and said traction wheel, a propelling motor, a second substantially vertical power transmitting shaft connected with said motor, and means for transmitting motion between said second power transmitting shaft and said first named power transmitting shaft independently of the angle through which said support may be turned when sluing the wheel for steering the vehicle.

In testimony whereof, I have signed my name to this specification this 22nd day of July, 1920.

ALDEN E. OSBORN.